United States Patent
Tao et al.

(10) Patent No.: US 11,580,957 B1
(45) Date of Patent: Feb. 14, 2023

(54) METHOD FOR TRAINING SPEECH RECOGNITION MODEL, METHOD AND SYSTEM FOR SPEECH RECOGNITION

(71) Applicant: INSTITUTE OF AUTOMATION, CHINESE ACADEMY OF SCIENCES, Beijing (CN)

(72) Inventors: Jianhua Tao, Beijing (CN); Zhengkun Tian, Beijing (CN); Jiangyan Yi, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/836,791

(22) Filed: Jun. 9, 2022

(30) Foreign Application Priority Data

Dec. 17, 2021 (CN) .......................... 202111548060.3

(51) Int. Cl.
*G10L 15/06* (2013.01)
*G10L 15/02* (2006.01)
(Continued)

(52) U.S. Cl.
CPC .......... *G10L 15/063* (2013.01); *G06F 40/284* (2020.01); *G10L 15/02* (2013.01); *G10L 15/197* (2013.01); *G10L 15/22* (2013.01)

(58) Field of Classification Search
CPC ..... G10L 15/063; G10L 15/02; G10L 15/197; G10L 15/22; G10L 15/005; G10L 15/193; G06F 40/284; G06N 3/084
See application file for complete search history.

(56) References Cited

U.S. PATENT DOCUMENTS

| 10,963,819 B1* | 3/2021 | Gangadharaiah ....... G06F 40/56 |
| 2015/0066496 A1* | 3/2015 | Deoras ................. G06N 3/0472 704/232 |

(Continued)

FOREIGN PATENT DOCUMENTS

| CN | 102968989 A | 3/2013 |
| CN | 112185352 A | 1/2021 |
| CN | 112599122 A | 4/2021 |

OTHER PUBLICATIONS

First Office Action issued in counterpart Chinese Patent Application No. 202111548060.3, dated Jan. 21, 2022.

*Primary Examiner* — Michael Colucci
(74) *Attorney, Agent, or Firm* — Westbridge IP LLC

(57) ABSTRACT

Disclosed are a method for training speech recognition model, a method and a system for speech recognition. The disclosure relates to field of speech recognition and includes: inputting an audio training sample into the acoustic encoder to represent acoustic features of the audio training sample in an encoded way and determine an acoustic encoded state vector; inputting a preset vocabulary into the language predictor to determine text prediction vector; inputting the text prediction vector into the text mapping layer to obtain a text output probability distribution; calculating a first loss function according to a target text sequence corresponding to the audio training sample and the text output probability distribution; inputting the text prediction vector and the acoustic encoded state vector into the joint network to calculate a second loss function, and performing iterative optimization according to the first loss function and the second loss function.

13 Claims, 4 Drawing Sheets

(51) Int. Cl.
*G06F 40/284* (2020.01)
*G10L 15/197* (2013.01)
*G10L 15/22* (2006.01)

(56) References Cited

U.S. PATENT DOCUMENTS

| | | | |
|---|---|---|---|
| 2018/0174576 A1* | 6/2018 | Soltau | G10L 21/10 |
| 2020/0349923 A1* | 11/2020 | Hu | G10L 15/193 |
| 2021/0233510 A1* | 7/2021 | Datta | G10L 15/005 |
| 2021/0312628 A1* | 10/2021 | Larlus-Larrondo | G06T 7/73 |
| 2022/0148571 A1* | 5/2022 | Wang | G06N 3/084 |

* cited by examiner

METHOD FOR TRAINING SPEECH RECOGNITION MODEL, METHOD AND SYSTEM FOR SPEECH RECOGNITION

CROSS-REFERENCE TO RELATED APPLICATIONS

The present disclosure claims priority to Chinese Patent Application 202111548060.3, entitled "Method for training speech recognition model, method and system for speech recognition", filed on Dec. 17, 2021, the entire content of which is incorporated herein by reference.

TECHNICAL FIELD

The disclosure relates to the technical field of speech recognition, in particular to a method for training a speech recognition model, a method and a system for speech recognition.

BACKGROUND

Transducer-based speech recognition model has been widely used at home and abroad, and its typical feature is that it can directly adapt to streaming speech recognition tasks. Although it introduces language predictor, its language modeling ability is insufficient. Through research, it is found that language predictor does not play the role similar to language model in real reasoning, but takes on the function of eliminating duplicate labels, and its ability to model dependencies between languages still has room for further improvement.

SUMMARY

In order to solve the above technical problems or at least partially solve the above technical problems, the embodiment of the disclosure provides a method for training a speech recognition model, a method for speech recognition, a system for speech recognition, an electronic device and a computer readable storage medium.

In a first aspect, the embodiment of the disclosure provides a method for training a speech recognition model, the speech recognition model includes an acoustic encoder, a language predictor, a text mapping layer and a joint network, the method for training the speech recognition model including:

inputting an audio training sample into the acoustic encoder to represent the acoustic features of the audio training sample in an encoded way and determine an acoustic encoded state vector of the audio training sample;

inputting a preset vocabulary into the language predictor to determine the text prediction vector of each label in the preset vocabulary;

inputting the text prediction vector into the text mapping layer to determine the probability that the text prediction vector is mapped to each label in the preset vocabulary, to obtain a text output probability distribution;

calculating a first loss function according to a target text sequence corresponding to the audio training sample and the text output probability distribution; and inputting the text prediction vector and the acoustic encoded state vector into the joint network to calculate a second loss function, and performing iterative optimization according to the first loss function and the second loss function until a stop condition is satisfied.

In an alternative embodiment, the performing iterative optimization according to the first loss function and the second loss function includes: determining a third loss function according to the first loss function and the second loss function; and performing iterative optimization according to the third loss function.

In an alternative embodiment, the first loss function is a cross entropy loss function, and the second loss function is a Transducer loss function.

In an alternative embodiment, the method further includes determining the third loss function according to the formula as follows:

$$L=(1-a)L_{Transducer}+aL_{Text}$$

where, L represents the third loss function, $L_{Text}$ represents the first loss function, $L_{Transducer}$ represents the second loss function, a represents a preset weight.

In an alternative embodiment, the inputting the audio training sample into the acoustic encoder to represent the acoustic features of the audio training sample in the encoded way includes: inputting the audio training sample into the acoustic encoder to obtain the acoustic features of the audio training sample and represent the acoustic features of the audio training sample in the encoded way.

In a second aspect, the embodiment of the disclosure provides a method for speech recognition, the method is applied to a speech recognition model trained according to any one of claims 1-4, the method for speech recognition including:

inputting an audio to be recognized into the acoustic encoder for representation in an encoded way to determine a text prediction vector of the audio to be recognized;

inputting a preset vocabulary into the language predictor to determine a text prediction vector of each label in the preset vocabulary;

inputting the text prediction vector into the text mapping layer to map the text prediction vector to the preset vocabulary and determine a first probability that the text prediction vector is mapped to each label in the preset vocabulary;

inputting the text prediction vector and the acoustic encoded state vector into the joint network to determine a second probability that the audio to be recognized is mapped to each label in the preset vocabulary; and determining a text content corresponding to the audio to be recognized according to the first probability and the second probability.

In an alternative embodiment, the determining the text content corresponding to the audio to be recognized according to the first probability and the second probability, includes: calculating a weighted sum of the first probability and the second probability; taking a maximum weighted sum as the text content corresponding to the audio to be recognized.

In an alternative embodiment, the method further includes determining the text content corresponding to the audio to be recognized according to the formula as follows:

In an alternative embodiment, the method further includes determining the text content corresponding to the audio to be recognized according to the formula as follows:

$$\text{Token} = \underset{i}{\text{argmax}} \{ P_{transducer}(\text{Token}_i \mid A_t, T_u) + \beta P_{text}(\text{Token}_i \mid \text{Token}_{0,1,2,\ldots,u}) \}$$

where, Token represents the text content corresponding to the audio to be recognized, $P_{text}(\text{Token}_i | \text{Token}_{0,1,2,\ldots,u})$ represents the first probability, $P_{transducer}(\text{Token}_i | A_t, T_u)$ represents the second probability, β represents a weight of text fusion, $A_t$ represents the acoustic encoded state vector of time t, $T_u$ represents the u-th label in the preset vocabulary.

In an alternative embodiment, the inputting the audio to be recognized into the acoustic encoder for representation in the encoded way includes: inputting the audio to be recognized into the acoustic encoder to obtain the acoustic features of the audio to be recognized and represent the acoustic features of the audio training sample in the encoded way.

In a third aspect, the embodiment of the present disclosure also provides a system for speech recognition, the system for speech recognition includes an acoustic encoder, a language predictor, a text mapping layer and a joint network;

where, the acoustic encoder is configured to represent an audio to be recognized in an encoded way and determine an acoustic encoded state vector of the audio to be recognized;

the language predictor is configured to determine a text prediction vector of each label in the preset vocabulary;

the text mapping layer is configured to map the text prediction vector to the preset vocabulary and determine a first probability that the text prediction vector is mapped to each label in the preset vocabulary;

the joint network is configured to determine a second probability that the audio to be recognized is mapped to each label in the preset vocabulary according to the text prediction vector and the acoustic encoded state vector and determine a text content corresponding to the audio to be recognized according to the first loss function and the second loss function.

In a fourth aspect, the embodiment of the present disclosure also provides an electronic device, where including a processor, a communication interface, a memory, and a communication bus, the processor, the communication interface and the memory communicate with each other through the communication bus; the memory is for storing at least one executable instruction, and the executable instruction enables the processor to implement steps of the method for training the speech recognition model or the method for speech recognition.

In a fifth aspect, the embodiment of the disclosure also provides a computer-readable storage medium with a computer program stored thereon, the computer program, when executed by a processor, implements steps of the method for training the speech recognition model or the method for speech recognition.

One or more technical solutions in the above embodiments possess at least part or all of the following advantages:

The speech recognition model according to the embodiment of the present disclosure adds a text mapping layer and adjusts the training process and the prediction process of the speech recognition model, which improves the modeling ability of the semantic recognition model, thereby improving the accuracy of the speech recognition model.

BRIEF DESCRIPTION OF THE DRAWINGS

The accompanying drawings herein, which are incorporated into the specification and constitute a part of the specification, show embodiments in accordance with the present disclosure and serve to explain the principle of the present disclosure together with the specification.

In order to describe the technical solutions more clearly in the embodiments of the present disclosure or the prior art, the accompanying drawings necessarily used for the description of the embodiments or related art will be briefly introduced in the following. It is obvious for those of ordinary skill in the art to obtain other accompanying drawings from these accompanying drawings without paying creative labor.

DETAILED DESCRIPTION OF THE EMBODIMENTS

In order to make the object, technical solution and advantages of the embodiments of the present disclosure clearer, the technical solution of the embodiments of the present disclosure will be clearly and completely described in conjunction with the accompanying drawings in the embodiments of the present disclosure, and it will be obvious that the described embodiments are part of the embodiments of the present disclosure, but not all of them. Based on the embodiments in the present disclosure, all other embodiments obtained by those of ordinary skill in the art without making creative efforts fall within the scope of protection of the present disclosure.

Transducer-based speech recognition model has been widely used at home and abroad. The model usually consists of three parts, namely acoustic encoder, language predictor and joint network. The acoustic encoder is responsible for encoding the input acoustic features into acoustic encoded state vectors. The input of the language predictor is a preset vocabulary (the predicted vocabulary includes space labels or previously predicted text labels), and the output of the language predictor is the text prediction state vector predicted at the current time. The input of the joint network is the acoustic encoded state vector output by the acoustic encoder and the text prediction state vector output by the language predictor at the current time, and the output of the joint network is the probability of all labels in the vocabulary. Although language predictor is introduced into this model, its language modeling ability is insufficient. Through research, it is found that language predictor does not play the role similar to language model in real reasoning, but takes on the role of eliminating duplicate labels. To solve this technical problem, the common method is to add auxiliary language model when decoding. Although this method may improve the accuracy of speech recognition system, it is not helpful to improve the language modeling ability of the model itself. In order to solve the technical problem, the embodiment of the present disclosure provides a method for training speech recognition model and a method for speech recognition. The method adjusts the training and decoding process of a Transducer speech recognition model so as to improve the accuracy of speech recognition of the model by improving the language modeling ability of the Transducer speech recognition model.

For the convenience of understanding the method for training the speech recognition model according to the embodiment of the present disclosure the following description will be given with reference to the accompanying drawings.

Figure 1:
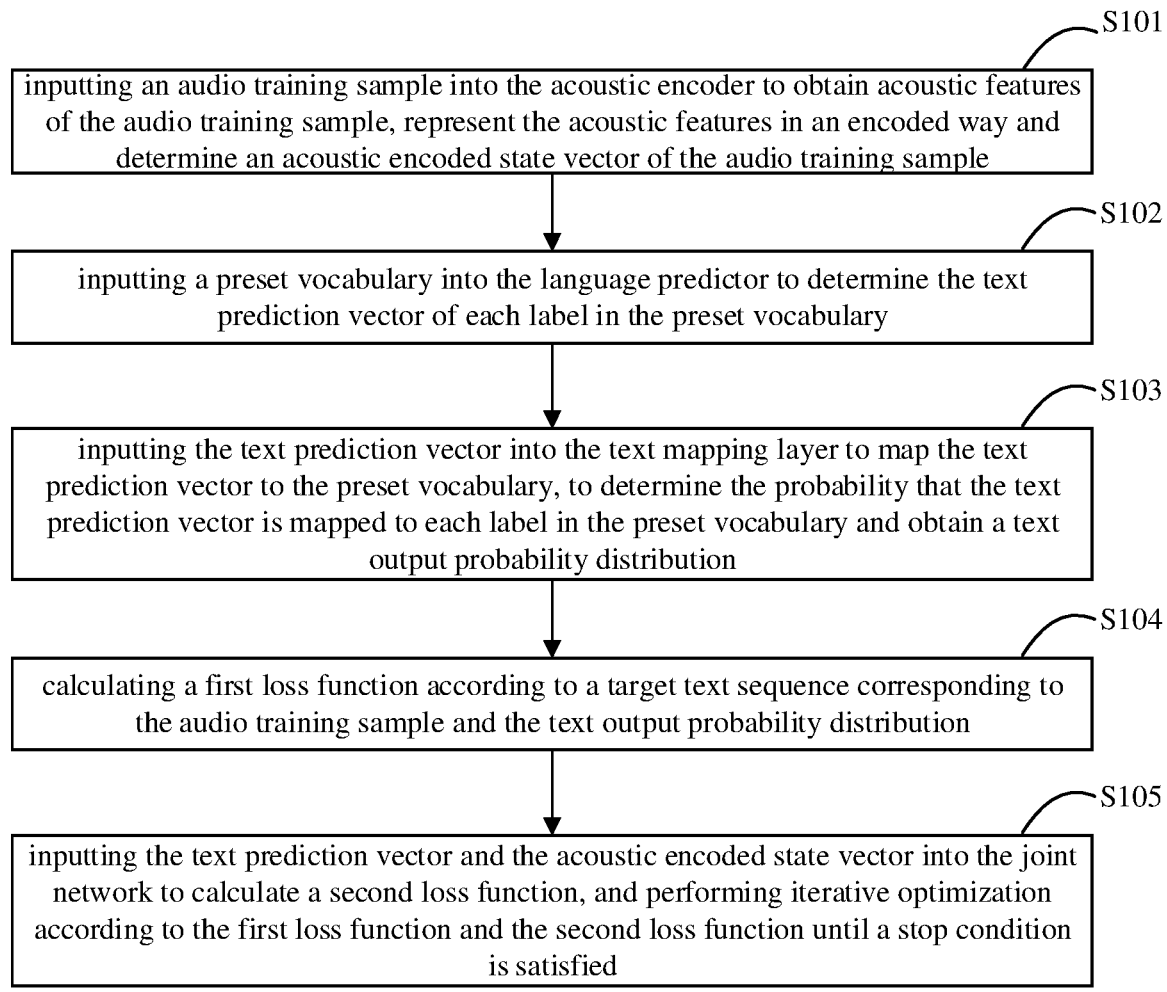
FIG. 1 schematically illustrates a flow chart of the main steps of a method for training a speech recognition model according to an embodiment of the present disclosure.
Figure 2:
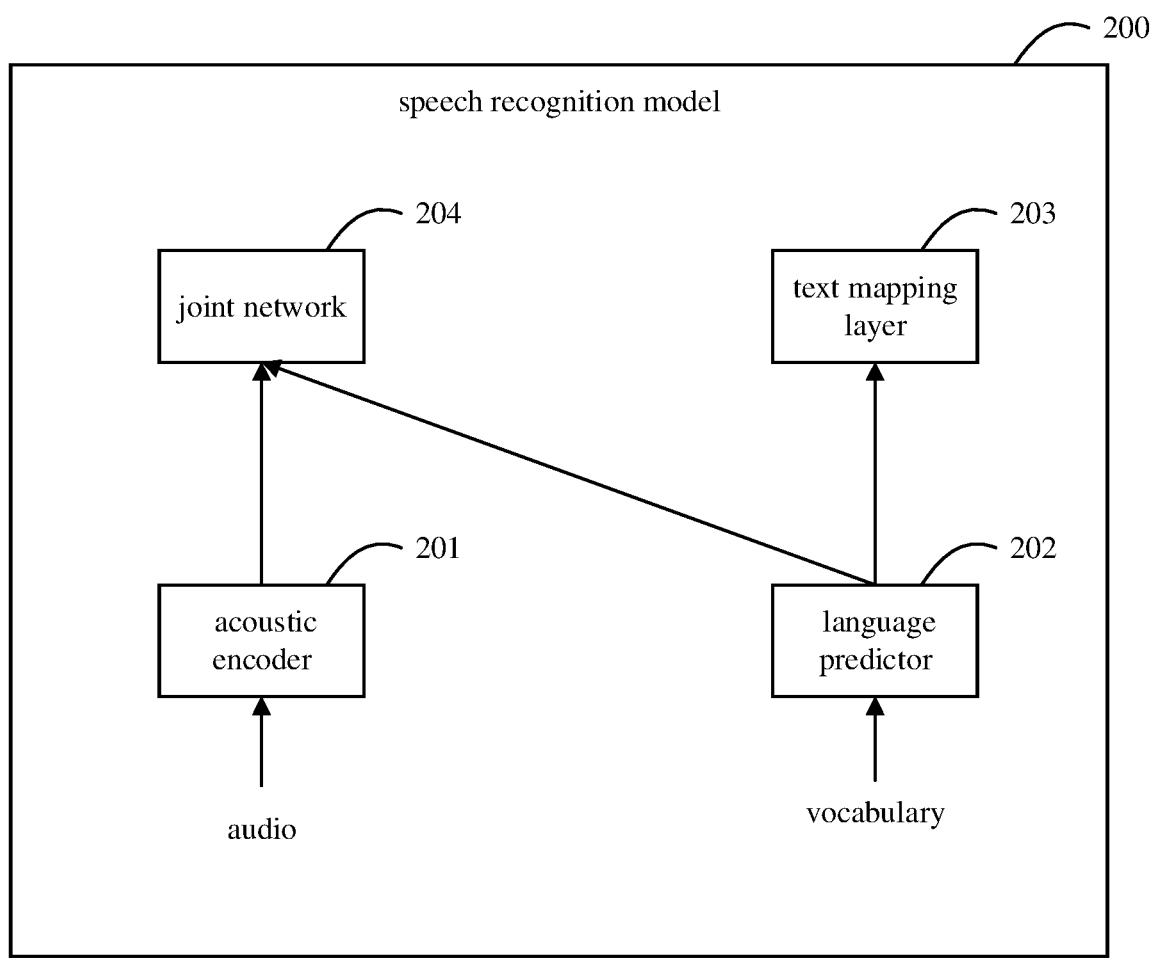
FIG. 2 schematically illustrates a structure diagram of a speech recognition model obtained by the method for training a speech recognition model according to an embodiment of the present disclosure.

FIG. 1 schematically illustrates a flow chart of the main steps of a method for training a speech recognition model according to an embodiment of the present disclosure. FIG. 2 schematically illustrates a structure diagram of a speech recognition model obtained by the method for training a speech recognition model according to an embodiment of the present disclosure. As shown in FIG. 2, the speech recognition model 200 includes: an acoustic encoder 201, a language predictor 202, a text mapping layer 203 and a joint network 204.

As shown in FIG. 1, the method for training the speech recognition model includes:

Step S101: inputting an audio training sample into the acoustic encoder to obtain acoustic features of the audio training sample, represent the acoustic features of the audio training sample in an encoded way and determine the acoustic encoded state vector of the audio training sample;

Step S102: inputting a preset vocabulary into the language predictor to determine the text prediction vector of each label in the preset vocabulary;

Step S103: inputting the text prediction vector into the text mapping layer to map the text prediction vector to the preset vocabulary, to determine the probability that the text prediction vector is mapped to each label in the preset vocabulary and obtain a text output probability distribution;

Step S104: calculating a first loss function according to a target text sequence corresponding to the audio training sample and the text output probability distribution; and Step S105: inputting the text prediction vector and the acoustic encoded state vector into the joint network to calculate a second loss function, and performing iterative optimization according to the first loss function and the second loss function until a stop condition is satisfied.

For step S101 in the present embodiment, the acoustic features may be, for example, an MFCC feature or an FBank feature or the like. MFCC (Mel-Frequency Cepstral Coefficients) and FBank (Filterbank) features are commonly used features in speech recognition. After obtaining the acoustic features of the audio training samples, the acoustic features of the audio training samples may be represented in an encoded way to obtain the acoustic encoded state vector of the audio training samples. In conjunction with FIG. 2, an audio training sample may be inputted into an acoustic encoder 201, acoustic features of the audio training sample may be obtained, and the acoustic features of the audio training sample may be represented in an encoded way to determine an acoustic encoded state vector of the audio training sample. As an example, the acoustic encoder 201 may be constructed by structures based on a cyclic neural network, a convolutional neural network or a Transformer model and variants of these models and combination or variants of these structures.

Referring to FIG. 2, for steps S102-S104, a preset vocabulary (the vocabulary includes space labels and non-space labels, and the non-space labels include commonly used words after statistics) may be inputted into the language prediction 202, and a text prediction vector may be calculated. After obtaining the text prediction vector, the text prediction vector may be inputted into a text mapping layer 203, the text mapping layer 203 includes only one layer of linear mapping, the inputted text prediction vector may be mapped to the preset vocabulary, and the probability that the text prediction vector is mapped to each label in the vocabulary may be calculated and obtained, a text output probability distribution may be obtained. Then, a first loss function may be calculated according to the target text sequence corresponding to the audio training sample and the text output probability distribution. Specifically, the process includes: determining the index, in the above-mentioned preset vocabulary, of the target text sequence corresponding to the audio training sample and determining the first probability corresponding to the target text sequence according to the index. For the first loss function, the first loss function may be a cross entropy loss function as an example.

For step S105, the text prediction vector and the acoustic encoded state vector may be inputted into the joint network 204, a second probability that the audio training sample is mapped to each label in the vocabulary may be calculated and obtained, and a second loss function may be calculated based on the second probability. As an example, the second loss function may be a Transducer loss function. Transducer loss function is a negative logarithmic loss function for calculation based on the Transducer speech recognition model, and it utilizes a forward and backward algorithm based on a dynamic programming idea to perform probability sum on all feasible audio-output label alignment paths and optimizes the negative logarithmic form of the probability sum. After obtaining the second loss function, the first loss function and the second loss function may be weighted and summed, and the joint optimization iteration may be performed until the stop condition such as model convergence is reached, at this point the speech recognition model may be obtained. Among them, the first loss function and the second loss function may be weighted and summed and the joint optimization iteration may be performed, which includes determining a third loss function according to the first loss function and the second loss function; performing iterative optimization according to the third loss function.

More specifically, the third loss function may be determined according to the following formula:

$$L=(1-a)L_{Transducer}+aL_{Text}$$

where, L represents the third loss function, $L_{Text}$ represents the first loss function, $L_{Transducer}$ represents the second loss function, a represents a preset weight.

The method for training the speech recognition model according to the embodiment of the present disclosure adjusts the training process of the speech recognition model, and improves the modeling ability of the semantic recognition model, thereby improving the accuracy of the speech recognition model.

Figure 3:
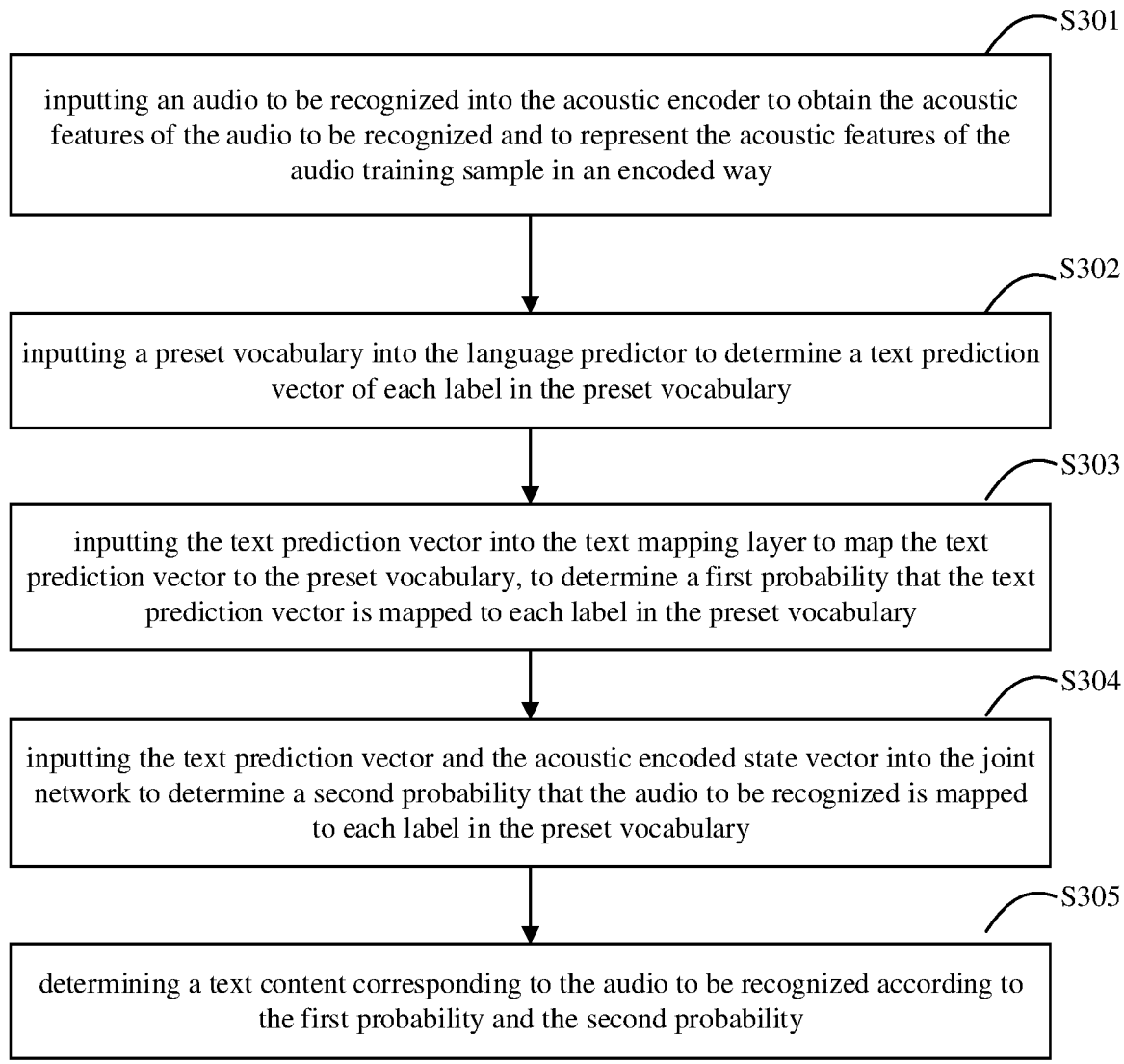
FIG. 3 schematically illustrates a flowchart of the main steps of a method for speech recognition according to an embodiment of the present disclosure.

FIG. 3 schematically illustrates a flowchart of the main steps of a method for speech recognition according to an embodiment of the present disclosure. The method for speech recognition may be applied to a speech recognition model trained by the embodiment shown in FIG. 1.

As shown in FIG. 3, the method for speech recognition includes:

Step S301: inputting an audio to be recognized into the acoustic encoder to obtain the acoustic features of the audio to be recognized and to represent the acoustic features of the audio training sample in an encoded way;

Step S302: inputting a preset vocabulary into the language predictor to determine a text prediction vector of each label in the preset vocabulary;

Step S303: inputting the text prediction vector into the text mapping layer to map the text prediction vector to the preset vocabulary, to determine a first probability that the text prediction vector is mapped to each label in the preset vocabulary;

Step S304: inputting the text prediction vector and the acoustic encoded state vector into the joint network to determine a second probability that the audio to be recognized is mapped to each label in the preset vocabulary; and Step S305: determining a text content corresponding to the audio to be recognized according to the first probability and the second probability.

In this embodiment, the audio to be recognized may be inputted into the acoustic encoder, and the acoustic features of the audio to be recognized, such as MFCC features or FBank features, may be obtained, and the acoustic features of the audio to be recognized are represented in an encoded way to obtain an acoustic encoded state vector $A_t$, where t represents time t. Then, the space label or non-space label in the preset vocabulary may be inputted into the language predictor, and the text prediction vector $T_u$ of each label may be calculated, where u represents the u-th label. Inputting the calculated text prediction vector into the text mapping layer, mapping the text prediction vector to the preset vocabulary, determining a first probability that the text prediction vector is mapped to each label in the preset vocabulary, thereby obtaining a text output probability distribution, where, the first probability that the text prediction vector is mapped to the u+1-th label $Token_{u+1}$ in the vocabulary is $P_{text}(Token_i|Token_{0,1,2,\ldots,u})$. Then, the text prediction vector and the acoustic encoded state vector may be inputted to the joint network, and the second probability $P_{transducer}(Token_i|A_t, T_u)$ that the audio to be recognized is mapped to each label in the preset vocabulary may be calculated. Finally, according to the first probability and the second probability, the text content corresponding to the audio to be recognized may be determined. If the joint network predicted a space label (i.e., the predicted audio to be recognized is a space label) according to the weighted sum of the first probability and the second probability, the text prediction vector input by the joint network is kept unchanged, and the next acoustic encoded state vector is updated. If a non-space label is predicted, the acoustic encoded state vector is kept unchanged, and the text prediction vector is updated. The above steps may be repeated until the speech recognition model predicts a space label based on the last acoustic encoded state vector or other stop conditions are reached in advance. In an alternative embodiment, the steps of determining the text content corresponding to the audio to be recognized according to the first probability and the second probability include: calculating a weighted sum of the first probability and the second probability; taking the maximum weighted sum as the text content corresponding to the audio to be recognized. More specifically, determining the weighted sum of the first probability and the second probability and determining the text content corresponding to the audio to be recognized in the step is performed according to the following formula:

$$\text{Token} = \underset{i}{\text{argmax}}\{P_{transducer}(Token_i | A_t, T_u) + \beta P_{text}(Token_i | Token_{0,1,2,\ldots,u})\}$$

where, Token represents the text content corresponding to the audio to be recognized, $P_{text}(Token_i|Token_{0,1,2,\ldots,u})$ represents the first probability, $P_{transducer}(Token_i|A_t, T_u)$ resents the second probability, β represents the weight of text fusion, $A_t$ represents an acoustic encoded state vector of time t, $T_u$ represents the u-th label in the preset vocabulary. In an alternative embodiment, a typical value of β is 0.1.

The speech recognition process of the embodiment of the disclosure adjusts the prediction process of the speech recognition model, improves the modeling ability of the semantic recognition model, thereby improving the accuracy of the speech recognition model.

Figure 4:
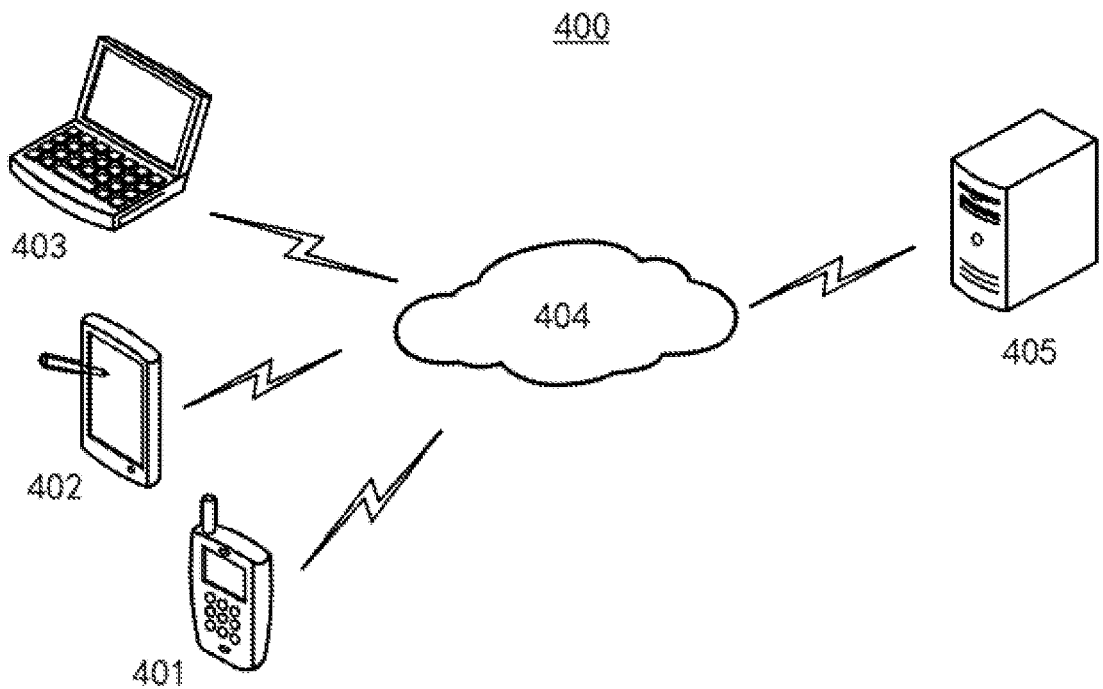
FIG. 4 schematically illustrates a system architecture suitable for a method for training a speech recognition model or a method for speech recognition according to an embodiment of the present disclosure.

FIG. 4 schematically illustrates a system architecture suitable for a method for training a speech recognition model or a method for speech recognition according to an embodiment of the present disclosure.

As shown in FIG. 4, a system architecture 400, suitable for a method for training a speech recognition model or a method for speech recognition according to an embodiment of the present disclosure, includes terminal devices 401, 402, 403, a network 404 and a server 405. The network 404 serves as a medium for providing a communication link between the terminal devices 401, 402, 403 and the server 405. The network 404 may include a variety of connection types such as wired, wireless communication links or fiber optic cables and the like.

The terminal devices 401, 402, 403 interact with the server 405 through the network 404 to receive or transmit messages or the like. Various communication client applications may be installed on the terminal devices 401, 402, 403. The terminal devices 401, 402, 403 may be electronic devices having a data acquisition function such as an audio acquisition function.

The Server 405 may be a server providing various services. The server can analyze and process the received requests or messages, and feed back the data processing results to the terminal equipment.

It should be noted that the method for training the speech recognition model and the method for speech recognition provided by the embodiments of the present disclosure may generally be executed by the server 405. The method for training the speech recognition model and the method for speech recognition provided by the embodiments of the present disclosure may also be performed by a server or a cluster of servers different from the server 405 and capable of communicating with the terminal devices 401, 402, 403 and/or the server 405.

It should be understood that the number of terminal devices, networks and servers in FIG. 4 is only schematic. According to the implementation requirements, there may be any number of terminal devices, networks and servers.

Figure 5:
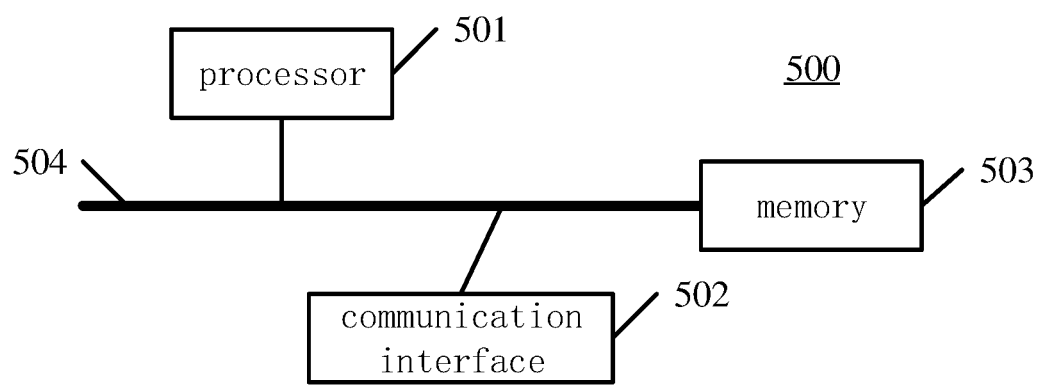
FIG. 5 schematically illustrates a structural block diagram of an electronic device provided by an embodiment of the present disclosure.

FIG. 5 schematically illustrates a structural block diagram of an electronic device provided by an embodiment of the present disclosure. As shown in FIG. 5, an electronic device 500 provided by an embodiment of the present disclosure includes a processor 501, a communication interface 502, a memory 503, and a communication bus 504, where the processor 501, the communication interface 502, and the memory 503 communicates with each other through the communication bus 504; the memory 503 may be used to store at least one executable instruction; the processor 501 may be used to implement the method for training the speech recognition model and the method for speech recognition described above when executing the executable instructions stored on the memory.

Specifically, when implementing the method for training the speech recognition model, the above-mentioned executable instructions make the above-mentioned processor execute the following steps: inputting an audio training sample into the acoustic encoder to represent the acoustic features of the audio training sample in an encoded way and determine the acoustic encoded state vector of the audio training sample; inputting a preset vocabulary into the language predictor to determine the text prediction vector of each label in the preset vocabulary; inputting the text prediction vector into the text mapping layer to map the text prediction vector to the preset vocabulary, determining the probability that the text prediction vector is mapped to each label in the preset vocabulary to obtain a text output probability distribution; calculating a first loss function according to a target text sequence corresponding to the audio training sample and the text output probability distribution; inputting the text prediction vector and the acoustic encoded state vector into the joint network to calculate a second loss function, and performing iterative optimization according to the first loss function and the second loss function until a stop condition is satisfied.

When implementing the method for speech recognition, the above-mentioned executable instructions make the above-mentioned processor execute the following steps: inputting an audio to be recognized into the acoustic encoder to obtain the acoustic features of the audio to be recognized, and representing the acoustic features of the audio training sample in an encoded way; inputting a preset vocabulary into the language predictor, and determining a text prediction vector of each label in the preset vocabulary; inputting the text prediction vector into the text mapping layer to map the text prediction vector to the preset vocabulary, and determining a first probability that the text prediction vector is mapped to each label in the preset vocabulary; inputting the text prediction vector and the acoustic encoded state vector into the joint network, and determining a second probability that the audio to be recognized is mapped to each label in the preset vocabulary; determining a text content corresponding to the audio to be recognized according to the first probability and the second probability.

The above-mentioned memory 503 may be an electronic memory such as the flash memory, Electrically Erasable Programmable Read Only Memory (EEPROM), EPROM, hard disk or ROM. The memory 503 has a storage space for the program code for executing any of the steps in the above-described methods. For example, the storage space for the program code may include individual program codes for implementing respective steps in the above methods. These program codes may be read from or written to one or more computer program products. These computer program products include program code carriers such as hard disks, optical disks (CD), memory cards, or floppy disks. Such computer program products are usually portable or fixed storage units. The memory unit may have a memory segment or a memory space or the like arranged similarly to the memory 503 in the above-described electronic device. The program code may be compressed, for example, in an appropriate form. Typically, the storage unit includes a program for performing the steps of the methods according to embodiments of the present disclosure, i.e. codes that can be read by, for example, a processor such as 501, which, when run by an electronic device, causes the electronic device to perform the various steps in the methods described above.

The embodiment of the disclosure also provides a computer-readable storage medium. The computer-readable storage medium stores a computer program that, when executed by a processor, may implement the method for training the speech recognition model and the method for speech recognition described above.

The computer-readable storage medium may be included in the device/apparatus described in the above embodiments; and it may also exist independently and not be assembled into the device/apparatus. The above-mentioned computer-readable storage medium carries one or more programs, and when the one or more programs are executed, the methods according to the embodiments of the disclosure may be implemented.

According to an embodiment of the application, The computer-readable storage medium may be a non-volatile computer-readable storage medium, for example, it may include, but is not limited to, portable computer disk, hard disk, random access memory (RAM), read only memory (ROM), erasable programmable read only memory (EPROM) or the flash memory, portable compact disk read only memory (CD-ROM), optical memory device, magnetic memory device or any suitable combination of the above. In the present disclosure, a computer-readable storage medium may be any tangible medium containing or storing a program that may be used by or in conjunction with an instruction execution system, apparatus or device.

Embodiments of the present disclosure provide that all or part of the above-mentioned technical solutions may be implemented in hardware, or in software modules running on one or more processors, or in combinations thereof. It will be understood by those skilled in the art that a microprocessor or a digital signal processor (DSP) may be used in practice to implement some or all of the functions of some or all of the components in an electronic device according to embodiments of the present application. Embodiments of the disclosure may also be implemented as apparatus or apparatus programs (e.g., computer programs and computer program products) for performing part or all of the methods described herein. A program implementing an embodiment of the disclosure may be stored on a computer-readable medium or may be in the form of one or more signals. Such a signal may be downloaded from an Internet site or provided on a carrier signal or in any other form.

It should be noted that relational terms such as "first" and "second" are used herein only to distinguish one entity or step from another and do not necessarily require or imply any such actual relationship or order between these entities or steps. Moreover, the terms "comprise", "include" or any other variation thereof are intended to encompass non-exclusive inclusion, so that a process, method, article or equipment that includes a set of elements includes not only those elements but also other elements that are not explicitly listed or are inherent to such a process, method, article or equipment. In the absence of further limitations, the elements defined by the phrase "including a . . . " do not exclude the existence of other identical elements in the process, method, article or equipment in which the elements are included.

The foregoing is only a specific embodiment of the disclosure to enable those skilled in the art to understand or practice the application. Various modifications to these embodiments will be apparent to those skilled in the art and the general principles defined herein may be implemented in other embodiments without departing from the spirit or scope of the disclosure. Accordingly the present disclosure will not be limited to the embodiments described herein but is intended to conform to the widest scope consistent with the principles and novel features applied herein.

What is claimed is:

1. A method for training a speech recognition model, wherein the speech recognition model comprises an acoustic encoder, a language predictor, a text mapping layer and a joint network, the method comprises:
   inputting an audio training sample into the acoustic encoder to represent the acoustic features of the audio training sample in an encoded way and determine an acoustic encoded state vector of the audio training sample;

inputting a preset vocabulary into the language predictor to determine a text prediction vector of a label in the preset vocabulary;

inputting the text prediction vector into the text mapping layer to determine the probability that the text prediction vector is mapped to each label in the preset vocabulary, to obtain a text output probability distribution;

calculating a first loss function according to a target text sequence corresponding to the audio training sample and the text output probability distribution; and inputting the text prediction vector and the acoustic encoded state vector into the joint network to calculate a second loss function, and performing iterative optimization according to the first loss function and the second loss function until a stop condition is satisfied, wherein the performing iterative optimization according to the first loss function and the second loss function comprises:

determining a third loss function according to the first loss function and the second loss function; and performing iterative optimization according to the third loss function.

2. The method according to claim 1, wherein the first loss function is a cross entropy loss function, and the second loss function is a Transducer loss function.

3. The method according to claim 2, wherein the method further comprises determining the third loss function according to the formula as follows:

$$L=(1-a)L_{Transducer}+aL_{Text}$$

wherein L represents the third loss function, $L_{Text}$ represents the first loss function, $l_{Transducer}$ represents the second loss function, a represents a preset weight.

4. The method according to claim 1, wherein inputting the audio training sample into the acoustic encoder to represent the acoustic features of the audio training sample in the encoded way comprises:

inputting the audio training sample into the acoustic encoder to obtain the acoustic features of the audio training sample and represent the acoustic features of the audio training sample in the encoded way.

5. A method for speech recognition, wherein the method is applied to a speech recognition model trained according to claim 1, the speech recognition model comprises an acoustic encoder, a language predictor, a text mapping layer and a joint network, the method comprises:

inputting an audio to be recognized into the acoustic encoder for representation in an encoded way to determine a text prediction vector of the audio to be recognized;

inputting a preset vocabulary into the language predictor to determine a text prediction vector of a label in the preset vocabulary;

inputting the text prediction vector into the text mapping layer to map the text prediction vector to the preset vocabulary and determine a first probability that the text prediction vector is mapped to each label in the preset vocabulary;

inputting the text prediction vector and the acoustic encoded state vector into the joint network to determine a second probability that the audio to be recognized is mapped to each label in the preset vocabulary; and determining a text content corresponding to the audio to be recognized according to the first probability and the second probability.

6. The method according to claim 5, wherein determining the text content corresponding to the audio to be recognized according to the first probability and the second probability comprises:

calculating a weighted sum of the first probability and the second probability; and taking a maximum weighted sum as the text content corresponding to the audio to be recognized.

7. The method according to claim 6, wherein the method further comprises determining the text content corresponding to the audio to be recognized according to the formula as follows:

$$\text{Token} = \underset{i}{\text{argmax}}\{P_{transducer}(\text{Token}_i \mid A_t, T_u) + \beta P_{text}(\text{Token}_i \mid \text{Token}_{0,1,2,\ldots,u})\}$$

where, Token represents the text content corresponding to the audio to be recognized, $P_{text}(\text{Token}_i \mid \text{Token}_{0,1,2,\ldots,u})$ represents the first probability, $P_{transducer}(\text{Token}_i \mid A_t, T_u)$ represents the second probability, β represents a weight of text fusion, $A^t$ represents the acoustic encoded state vector of time t, $T_u$ represents the u-th label in the preset vocabulary.

8. The method according to claim 5, wherein inputting the audio to be recognized into the acoustic encoder for representation in the encoded way comprises:

inputting the audio to be recognized into the acoustic encoder to obtain the acoustic features of the audio to be recognized and represent the acoustic features of the audio training sample in the encoded way.

9. A system for speech recognition, wherein the system for speech recognition comprises an acoustic encoder, a language predictor, a text mapping layer and a joint network;

wherein the acoustic encoder is configured to represent an audio to be recognized in an encoded way and determine an acoustic encoded state vector of the audio to be recognized;

the language predictor is configured to determine a text prediction vector of each label in the preset vocabulary;

the text mapping layer is configured to map the text prediction vector to the preset vocabulary and determine a first probability that the text prediction vector is mapped to each label in the preset vocabulary; and the joint network is configured to determine a second probability that the audio to be recognized is mapped to each label in the preset vocabulary according to the text prediction vector and the acoustic encoded state vector and determine a text content corresponding to the audio to be recognized according to a first loss function and a second loss function.

10. An electronic device, comprising a processor, a communication interface, a memory, and a communication bus, wherein the processor, the communication interface and the memory communicate with each other through the communication bus;

the memory is for storing at least one executable instruction, and the executable instruction enables the processor to implement steps of the method for training the speech recognition model according to claim 1.

11. An electronic device, comprising a processor, a communication interface, a memory, and a communication bus, wherein the processor, the communication interface and the memory communicate with each other through the communication bus;

the memory is for storing at least one executable instruction, and the executable instruction enables the processor to implement steps of the method for speech recognition according to claim 5.

12. A non-transitory computer-readable storage medium with a computer program stored thereon, wherein the computer program, when executed by a processor, implements steps of the method for training the speech recognition model according to claim 1.

13. A non-transitory computer-readable storage medium with a computer program stored thereon, wherein the computer program, when executed by a processor, implements steps of the method for speech recognition according to claim 5.

* * * * *